United States Patent
Dhuse et al.

(10) Patent No.: US 11,188,419 B1
(45) Date of Patent: Nov. 30, 2021

(54) NAMESPACE INDICES IN DISPERSED STORAGE NETWORKS

(71) Applicant: International Business Machines Corporation, Armonk, NY (US)

(72) Inventors: Gregory R. Dhuse, Chicago, IL (US); Ravi Khadiwala, Bartlett, IL (US); Andrew Dominic Baptist, Racine, WI (US); Jason Resch, Chicago, IL (US); Manish Motwani, Chicago, IL (US); Thomas Dubucq, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/885,334

(22) Filed: May 28, 2020

(51) Int. Cl.
| | | |
|---|---|---|
| *G06F 11/10* | (2006.01) | |
| *G06F 11/00* | (2006.01) | |
| *G06F 3/06* | (2006.01) | |
| *G06F 3/00* | (2006.01) | |
| *H04L 29/08* | (2006.01) | |
| *G06F 16/22* | (2019.01) | |
| *G06F 16/174* | (2019.01) | |

(52) U.S. Cl.
CPC .......... *G06F 11/1076* (2013.01); *G06F 3/067* (2013.01); *G06F 16/1752* (2019.01); *G06F 16/2228* (2019.01); *H04L 67/1097* (2013.01)

(58) Field of Classification Search
CPC .... G06F 11/1076; G06F 3/0619; G06F 3/064; G06F 3/067; G06F 2211/1028; G06F 16/1752; G06F 16/2228; H04L 9/0894; H04L 67/1097
See application file for complete search history.

(56) References Cited

U.S. PATENT DOCUMENTS

| | | |
|---|---|---|
| 8,171,102 B2 | 5/2012 | Gladwin et al. |
| 8,893,156 B2 | 11/2014 | Coelho et al. |

(Continued)

FOREIGN PATENT DOCUMENTS

WO 200948728 A1 4/2009

OTHER PUBLICATIONS

Looney, John, "Distributed Systems Reasoning", Slide presentation, Pipeline & Batch Systems (Part 1) Orchestration and Serving (Part 2), 99 pages, 2019, which can be viewed at the following website: https://tinyurl.com/srecon-dist-2019.

(Continued)

*Primary Examiner* — Justin R Knapp
(74) *Attorney, Agent, or Firm* — Timothy J. Singleton

(57) ABSTRACT

A method, system, and computer program product for implementing indices in a dispersed storage network (dsNet) are provided. The method receives a key-value pair to be stored in a dsNet. The method routes the key and the value within a data source containing a SourceName repository and a data buffer. The key is routed to the SourceName repository and the value is routed to the data buffer. The data source is erasure encoded into a set of data slices having a slice name and a slice buffer. The method stores the set of data slices within the dsNet. The method generates a namespace index with an index entry for the key-value pair. The index entry represents the key-value pair as a SourceName and a data source indicator with the SourceName and the data source indicator being associated with the set of data slices.

20 Claims, 8 Drawing Sheets

(56) References Cited

U.S. PATENT DOCUMENTS

| | | | |
|---|---|---|---|
| 9,170,849 B2 | 10/2015 | Calder et al. | |
| 9,465,861 B2 | 10/2016 | Dhuse et al. | |
| 9,760,440 B2 | 12/2017 | Baptist et al. | |
| 9,842,222 B2 | 12/2017 | Dhuse et al. | |
| 10,089,344 B2 | 10/2018 | Dhuse et al. | |
| 10,148,531 B1 | 12/2018 | Sledz et al. | |
| 10,365,968 B2 | 7/2019 | Motwani | |
| 10,372,540 B2 | 8/2019 | Baptist et al. | |
| 10,503,596 B2 | 12/2019 | Baptist et al. | |
| 10,579,450 B2 | 3/2020 | Khadiwala et al. | |
| 11,010,082 B2 * | 5/2021 | Nanda | G06F 3/0604 |
| 11,016,932 B2 * | 5/2021 | Qiu | G06F 16/137 |
| 2013/0304745 A1 | 11/2013 | Dhuse et al. | |
| 2018/0121127 A1 * | 5/2018 | Zhang | G06F 11/1435 |
| 2018/0181584 A1 * | 6/2018 | Bestler | G06F 16/134 |
| 2019/0004727 A1 | 1/2019 | Volvovski et al. | |
| 2019/0095344 A1 | 3/2019 | Gladwin et al. | |
| 2019/0129972 A1 * | 5/2019 | Borate | G06F 16/128 |
| 2021/0019298 A1 * | 1/2021 | Hegde | G06F 16/2272 |
| 2021/0097036 A1 * | 4/2021 | Wetterau | G06F 16/9566 |
| 2021/0181963 A1 * | 6/2021 | Choi | G06F 3/0607 |

OTHER PUBLICATIONS

Alvaro, Peter, "Data-centric Programming for Distributed Systems", Technical Report No. UCB/EECS-2015-242, EECS Department, Electrical Engineering and Computer Sciences University of California at Berkeley, 163 pages, Dec. 17, 2015.

Authors et al., Disclosed Anonymously, "Method and System for Providing Efficient Insertion Mechanisms for Unsorted Work Collections Stored in Dispersed Lockless Concurrent Indexes", 3 pages, IP.com No. IPCOM000258872D, IP.com Electronic Publication Date: Jun. 20, 2019.

Authors et. al., Disclosed Anonymously, "Method for Managing Dependent Work Items on Device Queue", 4 pages, IP.com No. IPCOM000233984D, IP.com Electronic Publication Date: Jan. 6, 2014.

Burns, Brendan, "Designing Distributed Systems", Patterns and Paradigms for Scalable, Reliable Services, O'REILLY®, 164 pages, Dec. 2017.

Anjum, A., "Data Intensive and Network Aware (DIANA) Grid Scheduling", The Faculty of Computing, Engineering and Mathematical Sciences,University of the West of England, Bristol 2006, 227 pages, Jul. 2007.

Authors et al., Disclosed Anonymously, Responsibility-based I/O Prioritization in Port-Sharing Storage Systems, IP.com No. IPCOM000259695D, IP.com Electronic Publication Date: Sep. 8, 2019, 6 pages.

Authors et al., Disclosed Anonymously, "A method to improve system performance by prioritizing and merging meta database operations", IP.com No. IPCOM000253262D, IP.com Electronic Publication Date: Mar. 18, 2018, 3 pages.

Dhuse et al., "Listing and Protocol for Namespace Index", U.S. Appl. No. 16/885,340, filed May 28, 2020.

Dubucq et al., "Leasing Unordered Items in Namespace Indices", U.S. Appl. No. 16/885,348, filed May 28, 2020.

Dubucq et al., "Leasing Prioritized Items in Namespace Indices", U.S. Appl. No. 16/885,357, filed May 28, 2020.

Appendix P, List of IBM Patents or Patent Applications Treated as Related, 2 pages, dated May 27, 2020.

\* cited by examiner

NAMESPACE INDICES IN DISPERSED STORAGE NETWORKS

BACKGROUND

Computing devices communicate, process, and store data. Computing devices may include smart phones, laptops, tables, personal computers, workstations, and video game devices. Computing devices may also include data centers and distributed computing networks.

Computing devices may extend capabilities of a central processing unit by using cloud computing or other networked computing architectures. In such architectures, a portion of computing functions to be performed by a computing device may be distributed among multiple computing devices spread across a communications network. For some services, applications, or operations, cloud computing and other networked computing systems may employ multiple cloud computing resources in a distributed manner. Distribution of services, applications, or operations may improve response times for completion of such services, applications, or operations. Similarly, computing devices may extend available storage or memory space using cloud storage or other distributed storage systems. Cloud storage enables storage of files, applications, and other data within a communication network storage system, such as an Internet storage system. Internet storage systems may include redundant array of independent disk (RAID) systems or dispersed storage systems which use error correction to encode and store data.

SUMMARY

According to an embodiment described herein, a computer-implemented method for implementing indices in a dispersed storage network (dsNet) is provided. The method receives a key-value pair to be stored in a dsNet. The method routes the key and the value within a data source containing a SourceName repository and a data buffer. The key is routed to the SourceName repository and the value is routed to the data buffer. The data source is erasure encoded into a set of data slices having a slice name and a slice buffer. The method stores the set of data slices within the dsNet. The method generates a namespace index with an index entry for the key-value pair. The index entry represents the key-value pair as a SourceName and a data source indicator with the SourceName and the data source indicator being associated with the set of data slices.

According to an embodiment described herein, a system for implementing indices in a dispersed storage network (dsNet) is provided. The system includes one or more processors and a computer-readable storage medium, coupled to the one or more processors, storing program instructions that, when executed by the one or more processors, cause the one or more processors to perform operations. The operations receive a key-value pair to be stored in a dsNet. The operations route the key and the value within a data source containing a SourceName repository and a data buffer. The key is routed to the SourceName repository and the value is routed to the data buffer. The data source is erasure encoded into a set of data slices having a slice name and a slice buffer. The operations store the set of data slices within the dsNet. The operations generate a namespace index with an index entry for the key-value pair. The index entry represents the key-value pair as a SourceName and a data source indicator with the SourceName and the data source indicator being associated with the set of data slices.

According to an embodiment described herein, a computer program product for implementing indices in a dispersed storage network (dsNet) is provided. The computer program product includes a computer-readable storage medium having program instructions embodied therewith, the program instructions being executable by one or more processors to cause the one or more processors to receive a key-value pair to be stored in a dsNet. The computer program product routes the key and the value within a data source containing a SourceName repository and a data buffer. The key is routed to the SourceName repository and the value is routed to the data buffer. The data source is erasure encoded into a set of data slices having a slice name and a slice buffer. The computer program product stores the set of data slices within the dsNet. The computer program product generates a namespace index with an index entry for the key-value pair. The index entry represents the key-value pair as a SourceName and a data source indicator with the SourceName and the data source indicator being associated with the set of data slices.

According to an embodiment described herein, a computer-implemented method for implementing indices in a dispersed storage network (dsNet) is provided. The method receives a key-value list request including a start key. In response to the key-value list request, a set of key-value list requests are transmitted to a plurality of data source units within a dispersed storage network (dsNet). The method identifies a set of keys returned from the plurality of data source units and identifies a subset of keys from the set of keys returned. The subset of keys including a union of the set of keys. The key-value pairs associated with the subset of keys are restored. The method generates a key-value list response to the key-value list request. The key-value list response includes restored key-value pairs for the subset of keys.

According to an embodiment described herein, a system for implementing indices in a dispersed storage network (dsNet) is provided. The system includes one or more processors and a computer-readable storage medium, coupled to the one or more processors, storing program instructions that, when executed by the one or more processors, cause the one or more processors to perform operations. The operations receive a key-value list request including a start key. In response to the key-value list request, a set of key-value list requests are transmitted to a plurality of data source units within a dispersed storage network (dsNet). The operations identify a set of keys returned from the plurality of data source units and identifies a subset of keys from the set of keys returned. The subset of keys including a union of the set of keys. The key-value pairs associated with the subset of keys are restored. The operations generate a key-value list response to the key-value list request. The key-value list response includes restored key-value pairs for the subset of keys.

According to an embodiment described herein, a computer program product for implementing indices in a dispersed storage network (dsNet) is provided. The computer program product includes a computer-readable storage medium having program instructions embodied therewith, the program instructions being executable by one or more processors to cause the one or more processors to receive a key-value list request including a start key. In response to the key-value list request, a set of key-value list requests are transmitted to a plurality of data source units within a dispersed storage network (dsNet). The computer program product identifies a set of keys returned from the plurality of data source units and identifies a subset of keys from the set of keys returned. The subset of keys including a union of the set of keys. The key-value pairs associated with the subset of keys are restored. The computer program product generates a key-value list response to the key-value list request. The key-value list response includes restored key-value pairs for the subset of keys.

According to an embodiment described herein, a computer-implemented method for implementing indices in a dispersed storage network (dsNet) is provided. The method accesses an unordered work queue containing a set of key-value pairs. A subset of expired key-value pairs is determined from the set of key-value pairs. The method transmits a work request to a plurality of data source units. The work request indicates a key-value pair being selected at random from the subset of expired key-value pairs. A threshold number of work responses is received from the plurality of data source units. The work responses include a set of available key-value pairs. The method selects an available key-value pair from the set of available key-value pairs and generates a work lease on the available key-value pair.

According to an embodiment described herein, a system for implementing indices in a dispersed storage network (dsNet) is provided. The system includes one or more processors and a computer-readable storage medium, coupled to the one or more processors, storing program instructions that, when executed by the one or more processors, cause the one or more processors to perform operations. The operations access an unordered work queue containing a set of key-value pairs. A subset of expired key-value pairs is determined from the set of key-value pairs. The operations transmit a work request to a plurality of data source units. The work request indicates a key-value pair being selected at random from the subset of expired key-value pairs. A threshold number of work responses is received from the plurality of data source units. The work responses include a set of available key-value pairs. The operations select an available key-value pair from the set of available key-value pairs and generate a work lease on the available key-value pair.

According to an embodiment described herein, a computer program product for implementing indices in a dispersed storage network (dsNet) is provided. The computer program product includes a computer-readable storage medium having program instructions embodied therewith, the program instructions being executable by one or more processors to cause the one or more processors to access an unordered work queue containing a set of key-value pairs. A subset of expired key-value pairs is determined from the set of key-value pairs. The computer program product transmits a work request to a plurality of data source units. The work request indicates a key-value pair being selected at random from the subset of expired key-value pairs. A threshold number of work responses is received from the plurality of data source units. The work responses include a set of available key-value pairs. The computer program product selects an available key-value pair from the set of available key-value pairs and generates a work lease on the available key-value pair.

According to an embodiment described herein, a computer-implemented method for implementing indices in a dispersed storage network (dsNet) is provided. The method accesses a work queue containing a set of work items as a set of key-value pairs. The key-value pairs are tuples including a work identifier and a work lease timestamp. The method selects a first work identifier and a first lease timestamp for a new work item to be included in the work queue. The set of work items and the new work item are ordered according to a priority scheme to generate a modified work queue. Based on the modified work queue, the method transmits a work request to a plurality of data source units. The work request including a hash parameter and a bit parameter. The hash parameter is associated with a key-value pair of the modified work queue. The bit parameter indicates a number of bits of the hash parameter to consider.

According to an embodiment described herein, a system for implementing indices in a dispersed storage network (dsNet) is provided. The system includes one or more processors and a computer-readable storage medium, coupled to the one or more processors, storing program instructions that, when executed by the one or more processors, cause the one or more processors to perform operations. The operations access a work queue containing a set of work items as a set of key-value pairs. The key-value pairs are tuples including a work identifier and a work lease timestamp. The operations select a first work identifier and a first lease timestamp for a new work item to be included in the work queue. The set of work items and the new work item are ordered according to a priority scheme to generate a modified work queue. Based on the modified work queue, the operations transmit a work request to a plurality of data source units. The work request including a hash parameter and a bit parameter. The hash parameter is associated with a key-value pair of the modified work queue. The bit parameter indicates a number of bits of the hash parameter to consider.

According to an embodiment described herein, a computer program product for implementing indices in a dispersed storage network (dsNet) is provided. The computer program product includes a computer-readable storage medium having program instructions embodied therewith, the program instructions being executable by one or more processors to cause the one or more processors to access a work queue containing a set of work items as a set of key-value pairs. The key-value pairs are tuples including a work identifier and a work lease timestamp. The computer program product selects a first work identifier and a first lease timestamp for a new work item to be included in the work queue. The set of work items and the new work item are ordered according to a priority scheme to generate a modified work queue. Based on the modified work queue, the computer program product transmits a work request to a plurality of data source units. The work request including a hash parameter and a bit parameter. The hash parameter is associated with a key-value pair of the modified work queue. The bit parameter indicates a number of bits of the hash parameter to consider.

DETAILED DESCRIPTION

Figure 1:
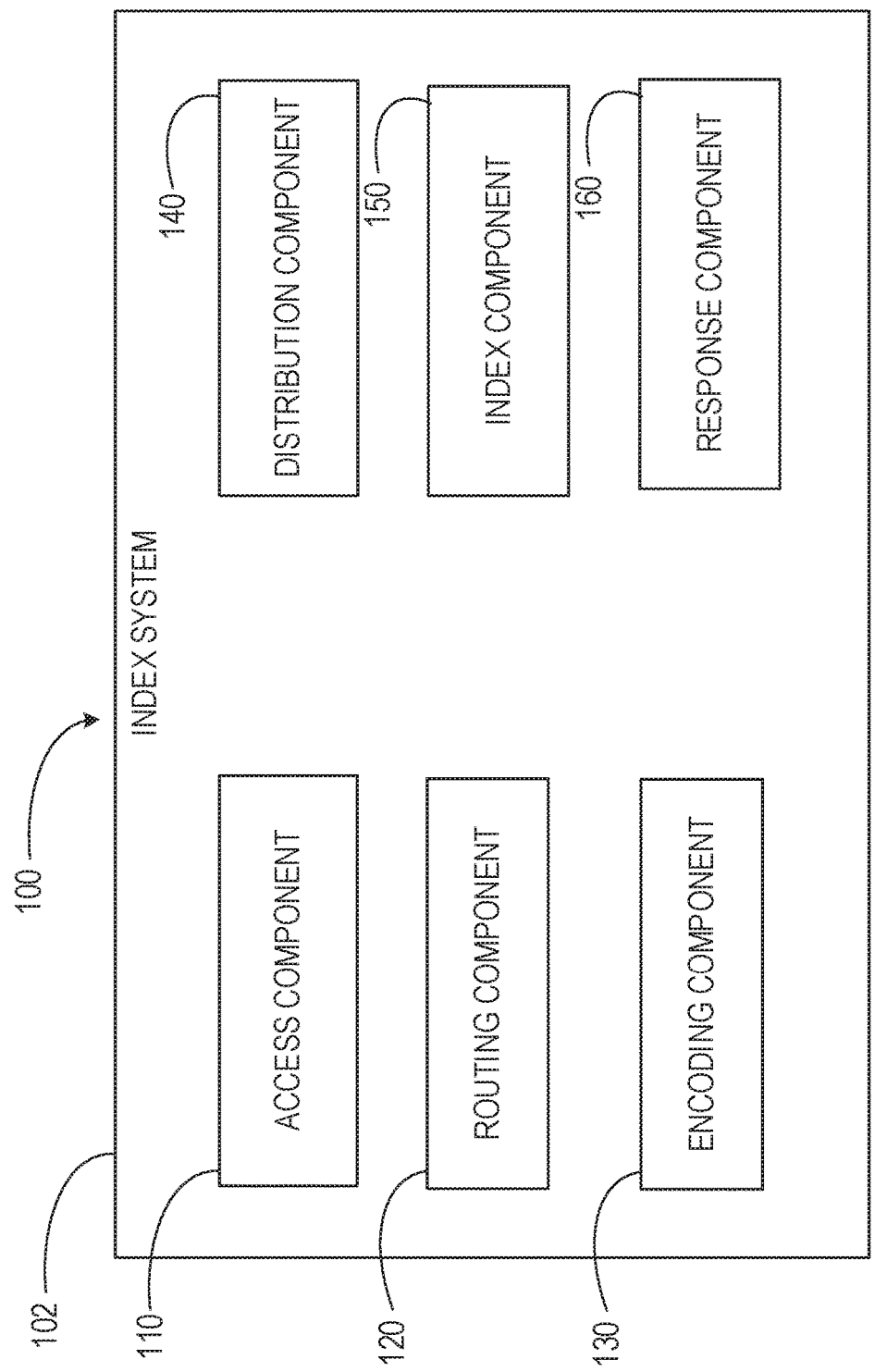
FIG. 1 depicts a block diagram of a computing environment for implementing concepts and computer-based methods, according to at least one embodiment.

The present disclosure relates generally to methods for implementing indices in a dispersed storage network (dsNet). More particularly, but not exclusively, embodiments of the present disclosure relate to a computer-implemented method for generating and using Namespace indices and control contention between multiple data source processing units. The present disclosure relates further to a related system for implementing indices in a dsNet, and a computer program product for operating such a system.

Some cloud computing or networked computing systems distribute information across network resources and process portions of that data at disparate locations associated with remote network resources. Some of these systems use dispersed BTree indices, such as a dispersed lockless concurrent index (DLCI). In DLCI, network resources may write information with updates that occur in the same index node. In these instances, the updates may contend or conflict when attempting to update the node. When information is to be written to DLCI nodes, the nodes are first read. The reading is performed in order to apply and insert or remove updated data. These read operations may use cumbersome or resource intensive disk seek operations. Further, DLCI uses nodes that are split or joined based on size.

Listing a dsNet index may return keys or key-value pairs in an order starting from a provided key. Namespace indices may be built on the dsNet namespace by encoding index keys into dsNet SourceNames. Some systems using standard dsNet listing may fail to return ordered lists of key-value pairs due to operations being prohibitively computationally expensive. Such systems may employ a naive scheme, sending a listing request to a plurality of data source units and compiling an ordered list of index keys. These systems may then employ a data source processing unit, for each key in the list, to issue a read request for each key's corresponding SourceName to a plurality of data source units. In this manner, some systems retrieve and reconstruct a value for a key. Given a listing of N results, the naive scheme uses one list and N read requests as well as N+1 seeks per data source unit.

Some systems use indices for implementation of work queues. A dsNet work queue may be an index of key-value pairs where the key names a piece of work to be done. The value may contain information used by a resource to execute a task associated with the piece of work. Leasable work queues may be used in some systems to allow resources to lease or reserve a piece of work for a period of time. While leased or reserved, other resources are prevented from performing work on the piece of work to prevent duplication of tasks on a given piece of work.

Embodiments of the present disclosure enable use of namespace indices to increase performance, decrease contention, and increase simplicity in some cloud or network-based computing systems. In some embodiments, namespace indices enable reading of entries to apply updates, without the use of nodes. In such embodiments, for non-overwrite inserts, read operations using namespace indices may be elided optimistically or satisfied without a seek operation by using a bloom filter. Since using namespace indices enable operations without the use of nodes, embodiments of the present disclosure may reduce complexity and potential pitfalls of split/join contentions, starvation, and malformed index structures often encountered with nodes. Some embodiments of the present disclosure list key-value pairs in namespace indices using extensions of multi-source compare-and-swap (CASN) distributed storage protocols.

In some embodiments, namespace indices used in dsNet may be implemented as work queues. A dsNet work queue may be an index of key-value pairs. Key names, within the key-value pairs, may represent or include a piece of work to be performed by a network resource, data source unit, or data source processing unit. Values, within the key-value pairs, may contain information used by a network resource, data source, or data source processing unit to execute the piece of work or task. In some embodiments, the work queues are leasable work queues. Leasable work queues allow resources or processors to lease a specified piece of work or task for some period of time. While the lease is held by a resource or processor, no other resources or processors may perform work. The lease may prevent duplication of work by different resources. In some embodiments of the present disclosure, a randomized strategy is used for leasing pieces of work from a work queue or namespace index. In such embodiments, unordered work queues may be used. Unordered work queues may be used along with the randomized strategy for efficient leasing without a centralized coordinator.

In some embodiments, the present disclosure describes using namespace indices or other indices in dsNet implementation of work queues. dsNet work queues may be an index of key-value pairs, where key names are a piece of work to be done and a value contains information a resource or processor may use to execute the piece of work. In some embodiments, the present disclosure describes use of leasable work queues. The present disclosure may enable selection of leasing keys in leasable work queue indices. In some embodiments of the present disclosure, the dsNet uses hash filtering for efficient leasing of ordered or prioritized work pieces from a queue or index.

Embodiments of the present disclosure enable listing of namespace indices with CASNListWithData to circumvent the naive scheme for listing namespace indices including key-value pairs. Some embodiments of the present disclosure provide a CASNListWithData as an extension of the CASN dispersed storage protocol. These embodiments enable combining listing keys and reading of corresponding values in a single protocol request. In some embodiments, each data source unit may satisfy the CASNListWithData request in a single seek when a relevant data slice is stored contiguously on a disk associated with the data source unit. Similarly, reduced numbers of seek operations may be performed when data slices are stored in an ordered key-value store, such as in LevelDB.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an index system 102. The index system 102 may comprise an access component 110, a routing component 120, an encoding component 130, a distribution component 140, an index component 150, and a response component 160. The access component 110 accesses and receives key-value pairs, indices, and messages transmitted to a data source processing unit. The routing component 120 routes key-value pairs within data sources of a dsNet. The encoding component 130 erasure encodes data sources into sets of data slices distributed across the dsNet. The distribution component 140 transmits messages and stores data slices among data sources and data source units distributed across the dsNet. The index component 150 generates and modifies namespace indices for the dsNet. The response component 160 generates responses and messages based on information received in response to requests transmitted by the distribution component 140. Although described with distinct components, it should be understood that, in at least some embodiments, components may be combined or divided, and/or additional components may be added without departing from the scope of the present disclosure.

Figure 2:
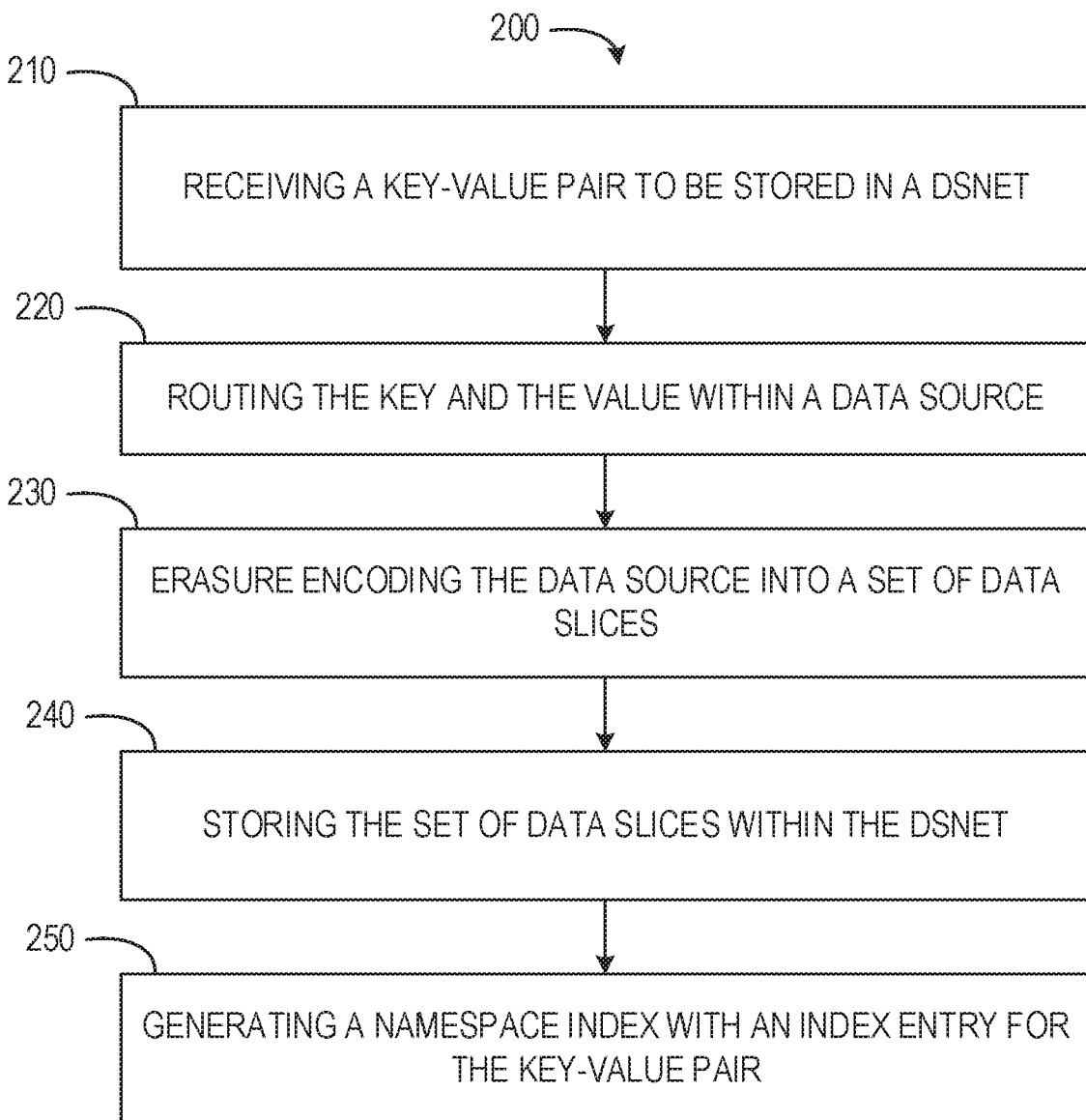
FIG. 2 depicts a flow diagram of a computer-implemented method for implementing indices in a dispersed storage network, according to at least one embodiment.

Referring now to FIG. 2, a flow diagram of a computer-implemented method 200 is shown. The computer-implemented method 200 is a method for implementing indices in a dispersed storage network. In some embodiments, the computer-implemented method 200 may be performed by one or more components of the computing environment 100 of FIG. 1, as described in more detail below.

At operation 210, the access component 110 receives a key-value pair to be stored in a dsNet. The access component 110 may receive the key-value pair from a computing device, resource, data source, data source unit, or data source processing unit associated with the dsNet. The access component 110 may receive the key-value pair via a communications network, a computing device input, or any other suitable means. Once accessed or received by the access component 110, the index component 150 may use a dsNet namespace directly to store the key-value pair. In such instances, the namespace index may employ functionality used by dsNet namespaces.

At operation 220, the routing component 120 routes the key and the value within a data source. Each data source may contain an atomic chunk of data. In some embodiments, the data source may contain a SourceName repository and a data buffer. The SourceName repository and the data buffer may comprise or describe the atomic chunk of data. In some embodiments, the routing component 120 routes the key to the SourceName repository. In some instances, the key is a SourceName to be stored in the SourceName repository. The routing component 120 routes the value to the data buffer. In some instances, the value is a JavaScript® Object Notation (JSON) object, metadata, or other suitable data associated with the key. The routing component 120 may route the key and value to a data source stored in a data source processing unit or resource of the dsNet.

At operation 230, the encoding component 130 erasure encodes the data source into a set of data slices. Each data slice may have a slice name and a slice buffer. In some embodiments, the encoding component 130 erasure encodes the data source using an information dispersal algorithm (IDA). In some embodiments, the routing component 120 cooperates with the encoding component 130 to route SourceNames (keys) to data sources and slice names to data slices. Once erasure encoded by the IDA, the atomic chunk of data of the data source may be transformed into one or more data slices.

For example, for an IDA with a width W and a threshold T (e.g., IDA [W,T]), each data source may be transformed into W data slices. Any T of the data slices may be used to reconstruct the original data source. By way of further example, if SourceName SN corresponds to data slice DS, each corresponding W data slices (e.g., DS [1 . . . W]) may have a corresponding slice name (e.g., SN [1 . . . W]). In some embodiments, each key-value pair received in operation 210 is represented, in the present examples, by a SourceName and data source by encoding the key into the SourceName and encoding the value into the data source.

At operation 240, the distribution component 140 stores the set of data slices within the dsNet. The data sources may be erasure encoded using an IDA and dispersed using the dsNet namespace. In some embodiments, the set of data slices are stored within the resources of the dsNet using a CASN dispersed storage protocol.

At operation 250, the index component 150 generates a namespace index. The namespace index has an index entry for the key-value pair. In some embodiments, the index entry represents the key-value pair as a SourceName and a data source indicator. The SourceName and the data source indicator may be associated with the set of data slices. In some embodiments, the key is encoded in the SourceName and the value is encoded in the data source indicator within the index entry. The key and value of each key-value pair may be encoded in the namespace index.

Key-value pairs of the namespace index may be used as standard data sources within the dsNet storage protocol. As such, the dsNet storage protocol may be used to read, write, delete, and list key-value pairs without additional special treatment. When used in conjunction with the CASN dispersed storage protocol, atomic updates may be made which span multiple key-value pairs. For example, a key-value pair may be removed from one index and added to another. Key-value pairs may also be added or removed from a namespace index atomically with other data source updates. This standardized atomic manipulation of key-value pairs may enable embodiments of the present disclosure to maintain consistent object metadata within the dsNet resources.

In some embodiments, the index component 150 maintains uniform or roughly uniform distribution of SourceNames within the dsNet. Uniform distribution of SourceNames across the dsNet namespace may balance storage utilization across multiple sets of data source units or data sources. Balanced storage utilization may enable each unit to receive approximately the same amount of data.

In some instances, keys in the namespace index may be non-uniform. For example, keys corresponding to user chosen object names may result in a lack of uniformity. Where keys are encoded into SourceNames for the namespace index, a non-uniform distribution may result in a portion of the dsNet namespace from user chosen object names. In some embodiments, to address potential imbalances, the index component uses key chunk maps.

The index component 150 may generate a key chunk map for the namespace index. The key chunk map includes a first mapping for each key by data slice index. The key chunk map may also include a second mapping for each key by namespace index keyspace. The key chunk map may store mapping for each vault by slice index, e.g., a pillar, as the first mapping. The key chunk map may also store a mapping for each vault by namespace index keyspace to a storage stripe containing a namespace for keys that fall into the pillar and range. In some embodiments, the key chunk map adds a layer of indirection to namespace lookups for storage types corresponding to the namespace index.

In some embodiments, the distribution component 140 cooperates with the index component 150 to distribute data slices within the dsNet based on one or more of the key chunk map and/or the namespace index. In some embodiments, the key chunk mapping is consulted during each namespace lookup and adjusted in order to balance an amount of namespace index data that is mapped to each stripe.

Figure 3:
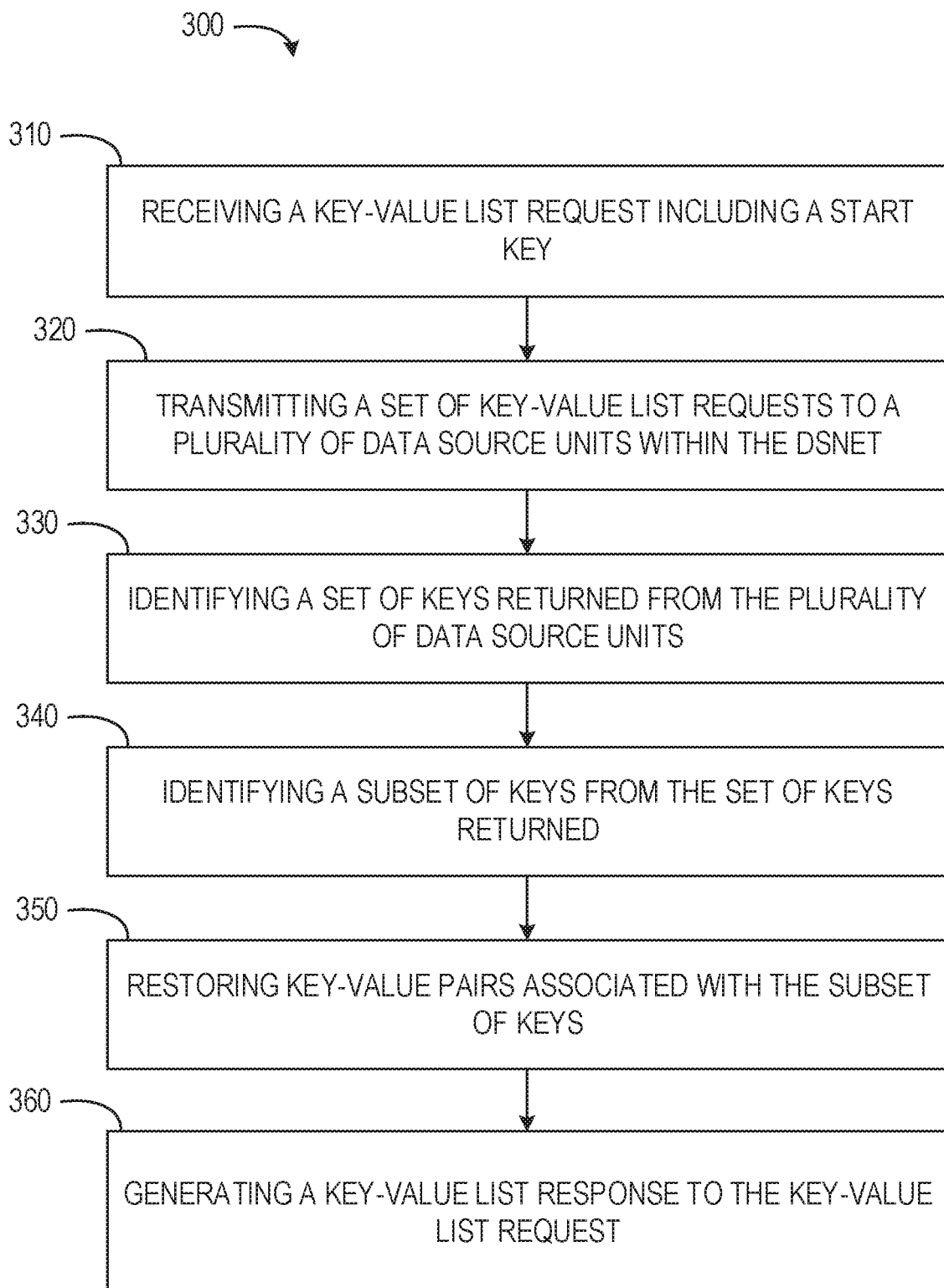
FIG. 3 depicts a flow diagram of a computer-implemented method for implementing indices in a dispersed storage network, according to at least one embodiment.

FIG. 3 shows a flow diagram of an embodiment of a computer-implemented method 300 for implementing indices in a dispersed storage network. The method 300 may be performed by or within the computing environment 100 of FIG. 1. In some embodiments, the method 300 comprises or incorporates one or more operations of the method 200 of FIG. 2. In some instances, operations of the method 300 may be incorporated as part of or sub-operations of the method 200.

In operation 310, the access component 110 receives a key-value list request including a start key. The access component 110 may be part of a data source processing unit. The data source processing unit, using the access component 110 and the distribution component 140, may pass the key-value list request to data source units for processing and return of a key-value response. The key-value list request may include a maximum key. The key-value list request may also include a pair integer indicating a maximum number of key-value pairs to return in response to the key-value list request. In some embodiments, the key-value list request is a CASNListWithData request.

In some embodiments, a data source unit receiving the CASNListWithData request may return a list of key-value pairs. The list of key-value pairs may be greater than or equal to a given start key included in the CASNListWithData request. In embodiments where a maximum key is provided in the CASNListWithData request, the key-value pair list may include keys greater than or equal to the start key and less than the maximum key. In some embodiments, the key-value pairs list contains a number of key-value pairs equal to or less than the maximum number of elements, if a maximum number of elements is provided in the CASNListWithData request.

In some embodiments, in the CASN protocol, read requests for a slice name of a data slice may return a collection of CASN contests for the slice name. The read requests may also provide associated data slice data along with the contests. The CASNListWithData request response may include CASN contest data for each key-value pair in the returned list.

In operation 320, the distribution component 140 transmits a set of key-value list requests to a plurality of data source units within the dsNet. In some embodiments, the set of key-value list requests are transmitted in response to the key-value list request received by the access component 110. The distribution component 140 may transmit T CASNListWithData requests to a plurality of data source units, where the data source processing unit is making the request for a vault with IDA of a specified width (W) and a specified threshold (T).

In operation 330, the index component 150 identifies a set of keys returned from the plurality of data source units. The set of keys may be returned from each data source unit of the plurality of data source units as part of a response. In some embodiments, for each of the first T CASNListWithData responses, the index component 150 performs operations to identify and restore key-value pairs responsive to the CASNListWithData request.

In operation 340, the index component 150 identifies a subset of keys from the set of keys returned. In some embodiments, the subset of keys include a union of the set of keys. The index component 150 may identify the union (U) of all keys returned for each of the first T CASNListWithData responses. In some embodiments, the index component 150 passes the subset of keys, or indications thereof, to the encoding component 130.

In operation 350, the encoding component 130 restores key-value pairs associated with the subset of keys. The encoding component 130 may restore the key-value pairs from the subset of keys using one or more CASN protocol functions. In some embodiments, the encoding component 130 executes at least one CASN read and restore logic operation. The read and restore operations may be performed for each key in the subset of keys.

In some embodiments, restoring the key-value pairs includes constructing a CASN scorecard. The CASN scorecard may include metadata for a SourceName associated with a key. In some instances, the metadata includes contest metadata for the SourceName associated with the key. The CASN scorecard may be constructed for each key in the subset of keys.

In some embodiments, the encoding component 130 constructs a CASN data center for slice data associated with a value. The CASN data center may be constructed for each value associated with the subset of keys. The CASN data centers may be constructed to manage slice data related to each value.

As noted above, for each key in the union (U), the encoding component 130 executes CASN read and restore logic. Once operations have been performed for all key-value pairs in the union (U), the subset of keys, a key-value list response may be generated. In some embodiments, the key-value list response is generated once all the key-value pairs in the union have been restored. In some instances, one or more errors may occur, and the key-value list response may be generated once operations have been performed and the errors have been logged.

In operation 360, the response component 160 generates a key-value list response to the key-value list request. In some embodiments, the key-value list response includes restored key-value pairs for the subset of keys. The response component 160 may generate a success message included in the key-value list response. The success message may be generated based on all of the key-value pairs associated with the subset of keys being restored.

In some embodiments, the response component 160 determines a failure to restore one or more key-value pairs associated with the subset of keys. The failure may occur when a key-value pair in the union cannot be restored due to an error. Where a failure to restore one or more key-value pairs is determined, the response component 160 generates an error message included in the key-value list response. The error message may indicate the one or more key-value pairs which failed to restore.

In some embodiments, additional data slices may be obtained or accessed to restore the key-value pairs for the subset of keys. In such embodiments, additional CASNListWithData requests are sent to a plurality of data source units. For each subsequent response to an additional CASNListWithData request, a key which does not appear in the union (U) or the subset of keys may be ignored or discarded. For keys which are included in the subset of keys or the union (U), the encoding component 130 and the index component 150 may perform one or more of the operations described above to restore the key-value pair for the key obtained in the subsequent response. In some instances, the response component 160 waits to generate a key-value list response until a stop condition occurs. The stop condition may be all key-value pairs being reconstructed, a specified amount of time elapsing, a specified number of errors occurring, or any other suitable stop condition. In some instances, the stop condition may occur when a specified number of additional CASNListWithData requests have been sent and responses have been received without correcting a previously identified error in reconstructing a key-value pair.

Figure 4:
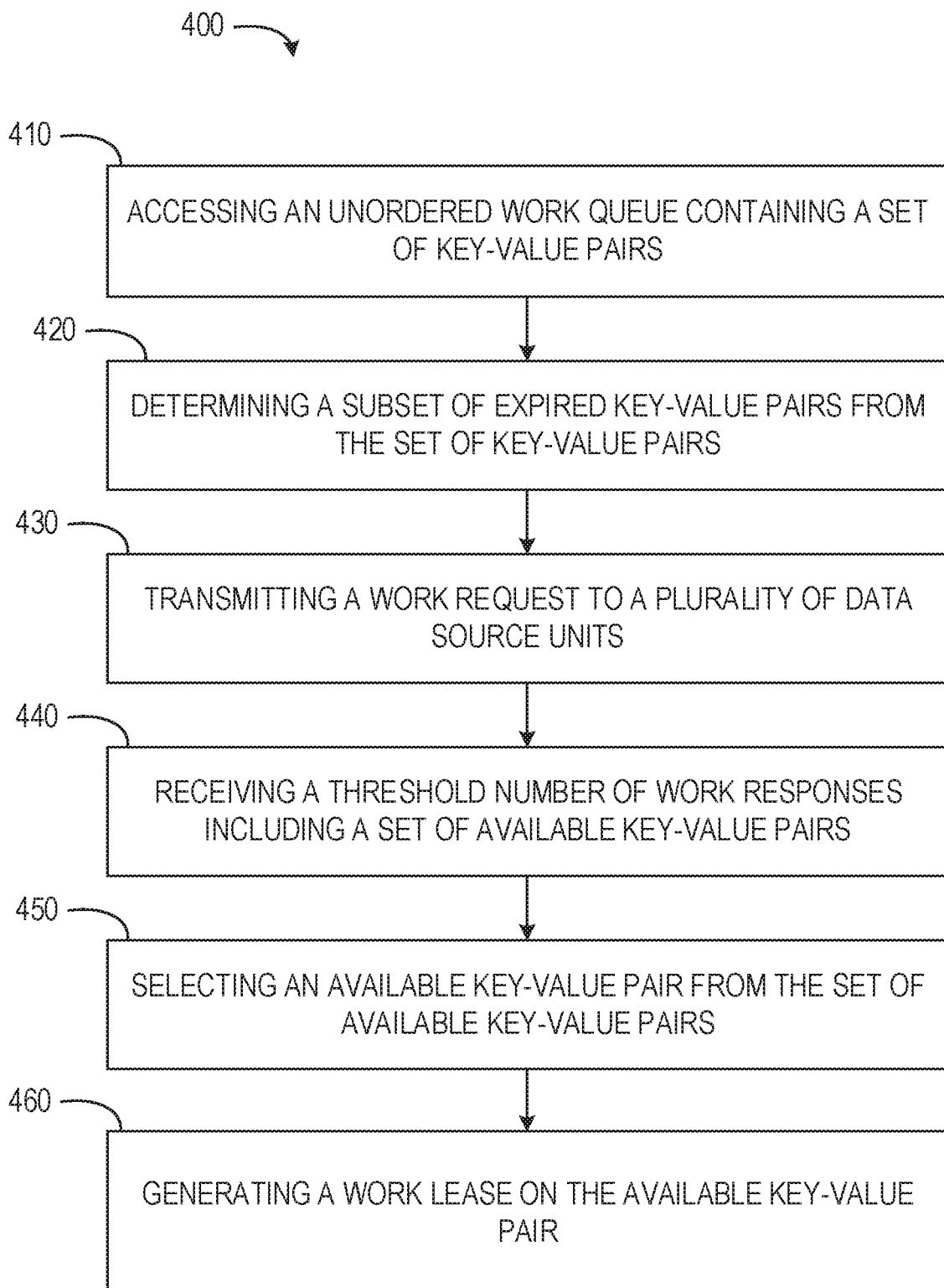
FIG. 4 depicts a flow diagram of a computer-implemented method for implementing indices in a dispersed storage network, according to at least one embodiment.

FIG. 4 shows a flow diagram of an embodiment of a computer-implemented method 400 for implementing indices in a dispersed storage network. The method 400 may be performed by or within the computing environment 100 of FIG. 1. In some embodiments, the method 400 comprises or incorporates one or more operations of the methods 200 (FIG. 2) and 300 (FIG. 3). In some instances, operations of the method 400 may be incorporated as part of or sub-operations of the methods 200 and 300.

In operation 410, the access component 110 accesses an unordered work queue containing a set of key-value pairs. In some embodiments, each key-value pair includes a tuple of a work identifier and a work lease timestamp. The tuple may be represented as (<random work id>, <lease timestamp>). The work identifier may be selected randomly or generated to encode information. Lease timestamps may enable server-side filtering of leased entries from list results.

In operation 420, the index component 150 determines a subset of expired key-value pairs from the set of key-value pairs. Expired key-value pairs are available for lease by a resource, data source unit, or data source processing unit. In some embodiments, when inserting a new work item into the set of key-value pairs or the subset of key-value pairs, the index component 150 selects a work identifier randomly as part of the key for the key-value pair. The index component 150 may then insert work in the value portion of the key-value pairs. The index component 150 may then insert the key-value pair into the set of key-value pairs or subset of key-value pairs with a lease timestamp indicating the piece of work is leasable or non-leasable.

In some embodiments, the index component 150 determines the subset of expired key-value pairs by identifying the subset of expired key-value pairs as one or more key-value pairs having a work lease timestamp with a value less than or equal to a current time. Where the index component 150 is inserting the new key-value pair, as referenced above, the index component 150 may insert the key-value pair with a lease timestamp of 0, where the piece of work is to be immediately leasable. Since 0 is less than or equal to any current time, the new piece of work is available for lease immediately and may be identified within the subset of key-value pairs. Although discussed with reference to the index component 150 inserting the new key-value pair, a data source unit, remote from the data source processing unit, or another resource may insert new key-value pairs to be identified by the index component 150 at the data source processing unit.

In operation 430, the distribution component 140 transmits a work request to a plurality of data source units. In some embodiments, the work request is a CASNListWithData request indicating a key-value pair. The key-value pair indicated in the CASNListWithData request may be selected at random from the subset of expired key-value pairs. In embodiments where each key-value pair includes a tuple of the work identifier and the work lease timestamp, the CASNListWithData indicates a work lease timestamp expiration.

In some embodiments, the CASNListWithData request includes a first key-value pair. The first key-value pair may be a starting key-value pair selected from the unordered work queue. In some instances, the first key-value pair may be selected at random to provide a starting point from which data sources may perform a search and provide a response for key-value pairs responsive to the request.

In some embodiments, the CASNListWithData request removes a portion of key-value pairs from consideration. The CASNListWithData request may remove key-value pairs from consideration which have a work lease timestamp greater than a specified time. The specified time may be a time elapsed from receipt of a work response associated with the key-value pair. In some embodiments, key-value pairs may be removed from consideration based on a work lease timestamp for the key-value pair existing in a namespace index or the work queue. In some embodiments, key-value pairs may be removed from consideration upon receipt of a work response, based on the work lease timestamp at the time of receipt of the work response. These key-value pairs may be removed from consideration prior to or at a time of receiving a specified number of work responses, as discussed in operation 340.

In some embodiments, the index component 150 determines the subset of expired key-value pairs using a CASNListWithData protocol request. In such embodiments, the CASNListWithData protocol request may include a lease expiry timestamp (T). Upon receipt of the CASNListWithData protocol request, a data source unit may execute the CASNListWithData request and filter key-value pairs. The key-value pairs may be filtered where the lease timestamp is not less than or equal to T from the returned responses.

In operation 440, the access component 110 receives a threshold number of work responses from the plurality of data source units. In some embodiments, the work responses include a set of available key-value pairs. The set of available key-value pairs may include at least a portion of the subset of expired key-value pairs.

In some embodiments, once the threshold number of work responses have been received, the encoding component 130 may restore or reconstruct a list of available work items from keys or key-value pairs returned within the work responses. In some embodiments, the encoding component 130 may restore or reconstruct the list or key-value pairs in a manner similar to or the same as described above with respect to operation 350.

In operation 450, the index component 150 selects an available key-value pair from the set of available key-value pairs. The index component 150 may select the available key-value pair at random. In some instances, the index component 150 selects the available key-value pair based on a priority scheme, priority indicator, or other suitable priority-based metric. In some instances, the index component 150 selects the available key-value pair as a first key-value pair which is leasable based on the lease timestamp. The index component 150 may select the available key-value pair by attempting to lease the available key-value pair.

In some embodiments, the index component 150 selects the available key-value pair by first reconstructing a list of available work items from the threshold number of work responses. The index component 150 may cooperate with the encoding component 130 to reconstruct the list in a manner similar to or the same as described above with respect to operation 350.

In some embodiments, the available key-value pair is a first key-value pair and a second key-value pair is selected instead of the first key-value pair. In some instances, the index component 150 identifies a conflict in the work lease on the first key-value pair. A contention, a type of conflict, may occur where more than one data source processing units simultaneously find and attempt to lease a same work or key-value pair. In some instances, the randomized leasing strategy addresses and precludes contention. If a conflict is detected, as a previously available key-value pair is determined to already be leased, the index component 150 selects the second key-value pair at random from the subset of expired key-value pairs.

In some embodiments, where the data source processor unit encounters a conflict above a configured threshold (e.g., a threshold number of conflicts), the index component 150 may select a new random work identifier. The index component 150 may select the new random work identifier as a minimum, attempting to lease a key-value pair from a beginning of the namespace index or set of key-value pairs.

In operation 460, the response component 160 generates a work lease on the available key-value pair. The key-value pair on which the work lease is generated may be the available key-value pair selected in operation 450. In some embodiments, the work lease modifies one or more bits, indicators, or metadata associated with the claimed key-value pair. The modification may remove the key-value pair from being available and appearing in the set of available key-value pairs. In some instances, the modification may be a modification to the lease timestamp. The modification to the lease timestamp may preclude the key-value pair from being provided in a subsequent work response until the lease is terminated or a time for the lease is expired.

Figure 5:
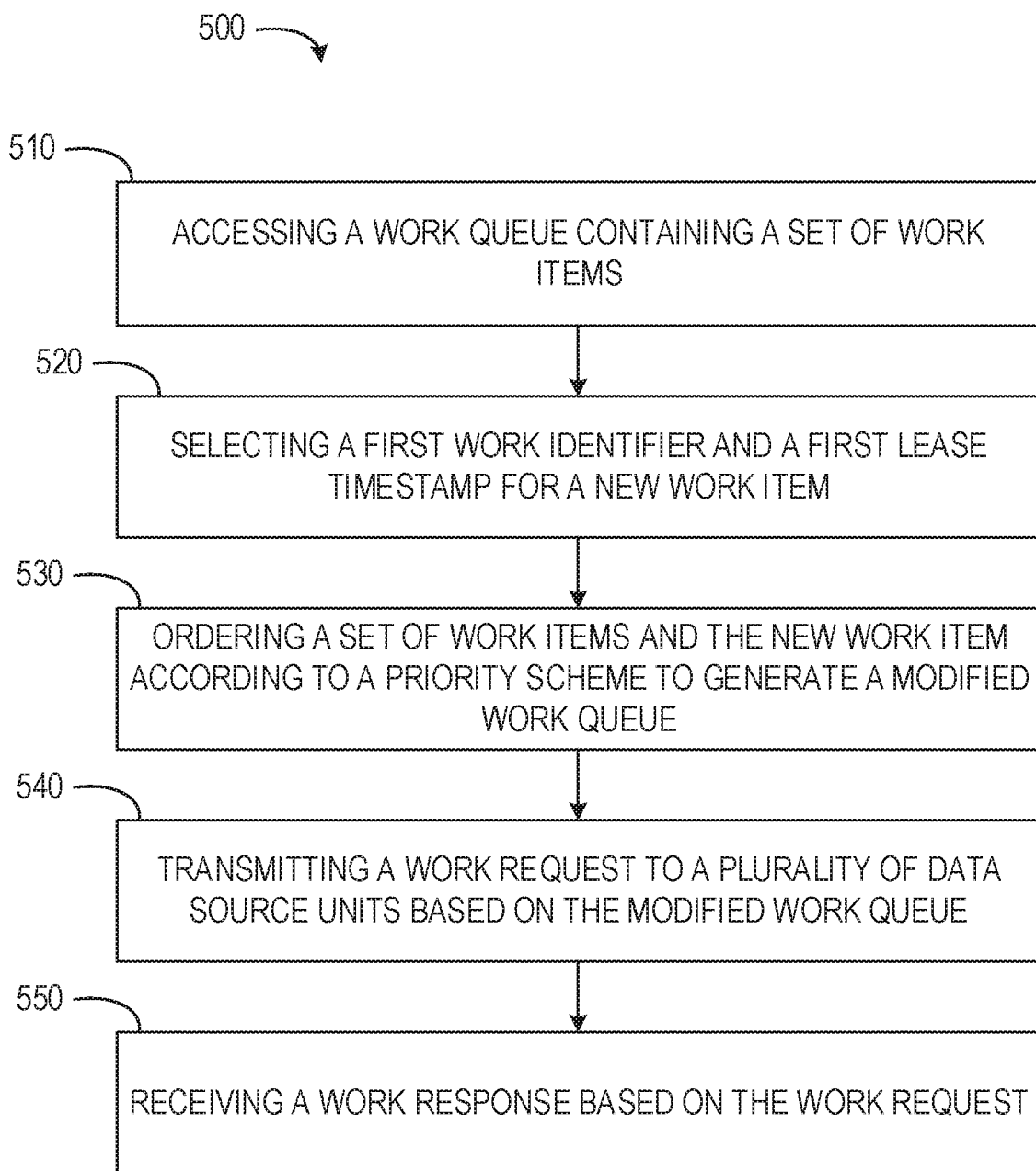
FIG. 5 depicts a flow diagram of a computer-implemented method for implementing indices in a dispersed storage network, according to at least one embodiment.

FIG. 5 shows a flow diagram of an embodiment of a computer-implemented method 500 for implementing indices in a dispersed storage network. The method 500 may be performed by or within the computing environment 100 (FIG. 1). In some embodiments, the method 500 comprises or incorporates one or more operations of the methods 200, 300, and 400 (FIGS. 2-4). In some instances, operations of the method 500 may be incorporated as part of or sub-operations of the methods 200, 300, or 400.

In operation 510, the access component 110 accesses a work queue containing a set of work items. The work items may be represented as a set of key-value pairs. In some embodiments, the key-value pairs are tuples including a work identifier and a work lease timestamp. The work identifier may be an ordered work identifier, such that the tuple may be represented as (<ordered work id>, <lease timestamp>).

In some embodiments, the work queue is ordered by a defined priority. The priority causes data source units to select and execute pieces of work having a higher priority before executing pieces of work having a lower priority. Key-value pairs with a lease timestamp less than or equal to a current time may be considered expired and available to lease.

In operation 520, the index component 150 selects a first work identifier and a first lease timestamp for a new work item to be included in the work queue. In some embodiments, the first work identifier is selected based on an ordering metric of the data source processing unit. The ordering metric may be the defined priority or associated therewith. In some embodiments, the first work identifier is selected based on a creation time for the new work item.

In some instances, when inserting a new work item into an ordered work queue, the data source unit or the index component 150 inserting the new work item generates the new work item with an ordered work identifier and a lease timestamp of 0. In such instances, the tuple for the new work item may be represented as (<ordered work id>, 0). Since 0 is less than or equal to any current time, the new work item is immediately available for lease.

The ordered work id may represent or include a priority assigned to the work item. The relative priority of the work item may be generated using any suitable order or priority metric. In some embodiments, the ordered work id represents a creation time, such that the work queue is ordered as a first-in-first-out list. In such embodiments, the tuple may include an indication of an insertion time, along with the work identifier and the lease timestamp. In such embodiments, the tuple may be represented as (<insert timestamp>, <work id>, <lease timestamp>). Here, the insert timestamp may be set to a current timestamp by a data source processing unit when the work item is inserted into the work queue and an initial lease timestamp of 0 may be used.

In some instances, the tuple is ordered based on lease timestamps. In such instances, the tuple may be represented as (<lease timestamp>, <work id>). In these instances, the work queue may be ordered to prioritize leasable work. Available or un-leased work may be added with an initial lease timestamp of 0. The new work item may therefore appear first in the work queue. Non-leasable work may be placed relatively farther down the work queue. To add non-leasable work items to the work queue, the index component 150 or a data source processing unit may add the new work item with a pre-determined initial lease timestamp. The pre-determined lease timestamp may effectively schedule the new work item for execution at some time in the future. The pre-determined lease timestamp may delay execution of the new work item without explicitly scheduling a time for execution of the new work item.

In operation 530, the index component 150 orders the set of work items and the new work item according to a priority scheme to generate a modified work queue. In some embodiments, the set of work items in the work queue may be automatically ordered by the index component 150 based on values entered for one or more of the work id, the lease timestamp, the insert timestamp, or the ordered work id. In some instances, the index component 150 orders the set of work items and the new work item in response to creation of the new work item by modifying an order of one or more preexisting work items.

In some embodiments, the priority scheme for ordering work is based on work lease timestamps of work items of the set of work items. In such embodiments, the modified work queue is generated by inserting the new work item based on a value of the first lease timestamp and values of the work lease timestamps for the set of work items. In these embodiments, the first work identifier may be selected based on an ordering metric of the data source processing unit.

In some embodiments, the priority scheme is based on work identifiers of work items of the set of work items. In such embodiments, the modified work queue is generated by inserting the new work item into the work queue such that the modified work queue is in a first in first out order. In such embodiments, the first work identifier is selected based on a creation time for the new work item.

In some embodiments, the priority scheme orders the modified work queue such that leasable work items are placed before non-leasable work items in the modified work queue.

In operation 540, the distribution component 140 transmits a work request to a plurality of data source units. The work request may be transmitted based on the modified work queue. In some embodiments, the work request is a CASNListWithData request including a hash parameter (H) and a bit parameter (B). The hash parameter may be associated with a key-value pair of the modified work queue. In some embodiments, the hash parameter is a value indicating a position or location, determined based on a hash function, to initiate searching of the modified work queue. The hash parameter may be selected by the data source processing unit transmitting the work request. In some instances, the hash parameter is selected at random. In some embodiments, the bit parameter indicates a number of bits of the hash parameter to consider. In some instances, the CASNListWithData request includes a lease expiry timestamp T.

By way of example, when provided a request indicating a random value for H and at least B bits in length, the data source unit begins listing from a leftmost key, providing H, B, and the current timestamp T in a request to a plurality of data source units.

In operation 550, the access component 110 receives a work response based on the work request. In some embodiments, the work response includes available work items selected based on the hash parameter and the bit parameter. Upon receiving the work request, a data source unit executes the CASNListWithData request. In executing the work request, the data source unit filters key-value pairs where the lease timestamp is not less than or equal to T (e.g., greater than T) from the returned responses. Further the data source unit filters keys to include those keys represented by the hash parameter and bit parameter. The filtered keys may be represented as substr(hash(<key>), B bits)=H. Filtering the keys allows the data source unit to return leasable keys based on a hash function. For example, the data source unit may return every $2^B$ leasable key to the data source processing unit associated with the access component 110 and the distribution component 140. In these instances, two units attempt to lease the same key only where they have both randomly chosen the same value H.

In the example provided above, each data source unit filters for unleased entries such that substr(hash(<key>), B bits)=H. The data source units return every $1/(2^B)$th unleased entry. When B=0, a filter matches all keys in a group of key-value pairs. The work response may be generated upon receiving a threshold of responses and reconstructing a list of available work items. The work response may be generated and the list reconstructed in a manner similar to or the same as described above with respect to operations 350 or 440. In some embodiments, the response component 160 generates a completion response based on the work response. The completion response may indicate a success or a failure of the work response to return available or leasable work items.

Once the response is generated and received by the data source processing unit, the data source processing unit may attempt to lease one or more work items. Where a work item is available to be leased, the data source processing unit may lease the work item. If a conflict is detected above a configured threshold, the data source processing unit may restart one or more operations of the method 500. In some instances, the data source processing unit may restart using a bit parameter of B=B+1 to reduce a likelihood of returning a work item. When no conflicts are encountered for a period of time or no items are returned, the data source processing unit may restart with B=B−1 in order to return a greater percentage of work items.

In some instances, the data source processing unit may restart using a different value of the bit parameter or a different value of the hash parameter to avoid starvation. When B=0 and no new items are returned, the work queue may be understood to be empty. In such instances, the data source processing unit may terminate or pause operations. Embodiments of the present disclosure of the method 500 may enable resources to lease work items in approximate order of priority. The leasing of work items may also dynamically adjust to a percentage of items leased in response to conflicts. When the number of data source processing units does not change, each unit may converge to a value B that minimizes content among the units.

Figure 6:
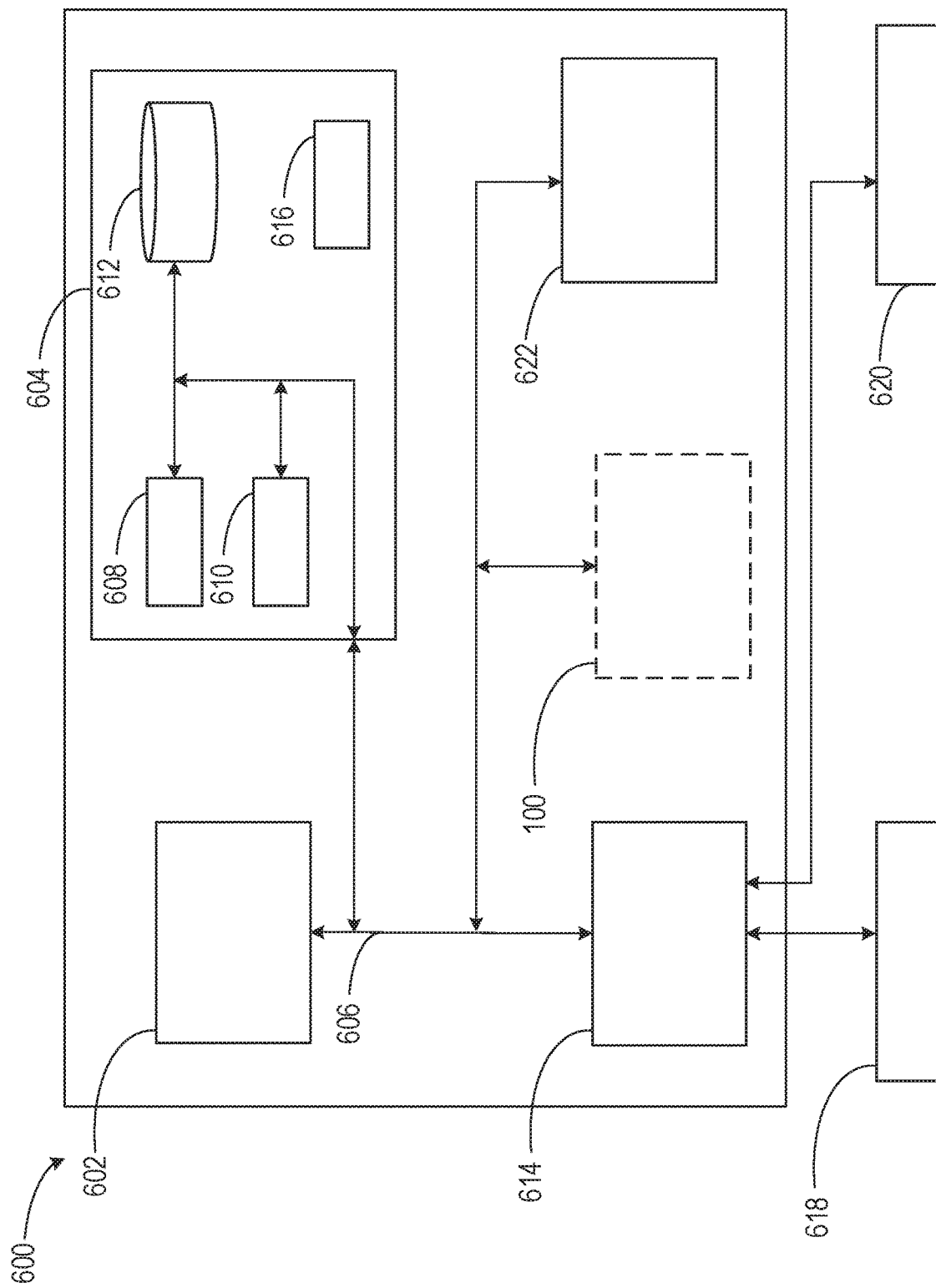
FIG. 6 depicts a block diagram of a computing system for implementing indices in a dispersed storage network, according to at least one embodiment.

Embodiments of the present disclosure may be implemented together with virtually any type of computer, regardless of the platform is suitable for storing and/or executing program code. FIG. 6 shows, as an example, a computing system 600 (e.g., cloud computing system) suitable for executing program code related to the methods disclosed herein and for implementing indices in a dispersed storage network.

The computing system 600 is only one example of a suitable computer system and is not intended to suggest any limitation as to the scope of use or functionality of embodiments of the present disclosure described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors 602 (e.g., processing units), a system memory 604 (e.g., a computer-readable storage medium coupled to the one or more processors), and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, the system memory 604 may include at least one program product having a set (e.g., at least one) of program modules that are configured to carry out the functions of embodiments of the present disclosure.

The program/utility, having a set (at least one) of program modules 616, may be stored in the system memory 604 by way of example, and not limiting, as well as an operating system, one or more application programs, other program modules, and program data. Program modules may include one or more of the access component 110, the routing component 120, the encoding component 130, the distribution component 140, the index component 150, and the response component 160, which are illustrated in FIG. 1. Each of the operating systems, one or more application programs, other program modules, and program data or some combination thereof, may include an implementation of a networking environment. Program modules 616 generally carry out the functions and/or methodologies of embodiments of the present disclosure, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 7:
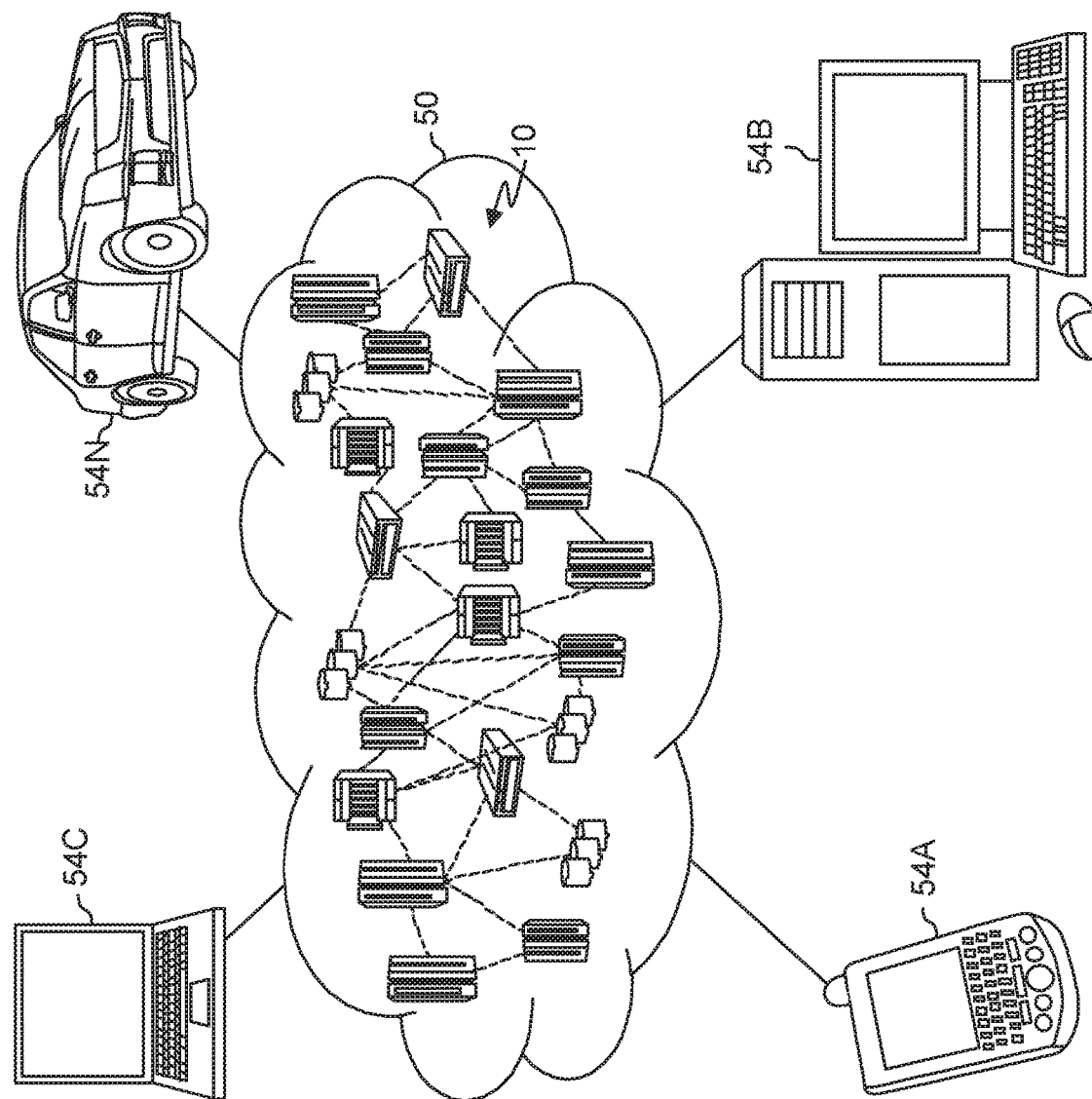
FIG. 7 is a schematic diagram of a cloud computing environment in which concepts of the present disclosure may be implemented, in accordance with at least one embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
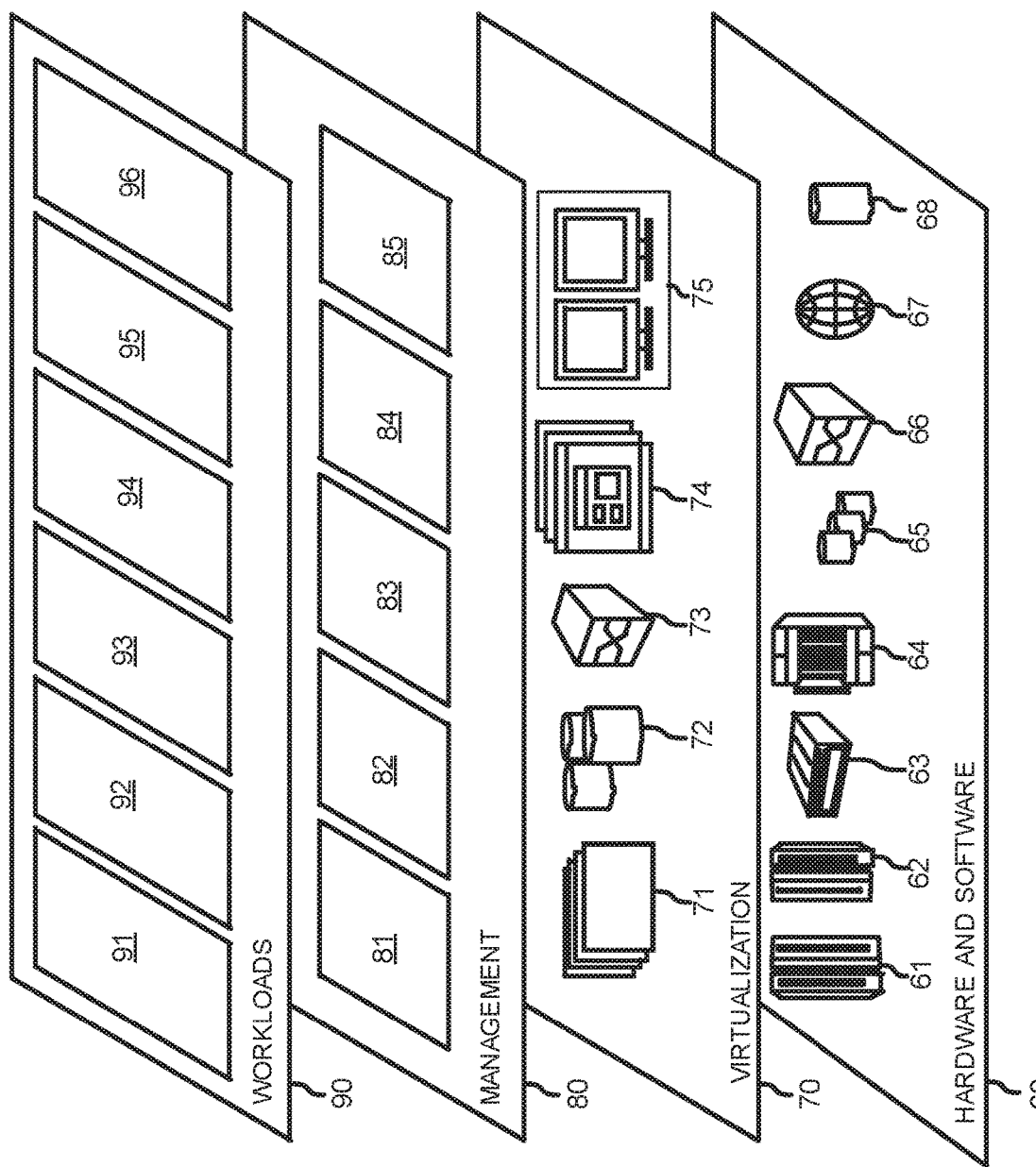
FIG. 8 is a diagram of model layers of a cloud computing environment in which concepts of the present disclosure may be implemented, in accordance with at least one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and namespace index processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a key-value pair to be stored in a dispersed storage network (dsNet);
routing a key and a value of the key-value pair within a data source, the data source containing a SourceName repository and a data buffer, the key being routed to the SourceName repository and the value being routed to the data buffer;
erasure encoding the data source into a set of data slices, each data slice having a slice name and a slice buffer;
storing the set of data slices within the dsNet; and
generating a namespace index with an index entry for the key-value pair, the index entry represents the key-value pair as a SourceName and a data source indicator, the SourceName and the data source indicator being associated with the set of data slices.

2. The method of claim 1, wherein the key is encoded in the SourceName and the value is encoded in the data source indicator within the index entry for the key-value pair within the namespace index.

3. The method of claim 1, wherein the data source is erasure encoded using an information dispersal algorithm.

4. The method of claim 1, further comprising:
maintaining uniform distribution of SourceNames within the dsNet.

5. The method of claim 4, further comprising:
generating a key chunk map for the namespace index.

6. The method of claim 5, wherein the key chunk map includes a first mapping for each key by data slice index and a second mapping for each key by namespace index key-space.

7. The method of claim 5, further comprising:
distributing data slices within the dsNet based on the key chunk map and the namespace index.

8. A system, comprising:
one or more processors; and
a computer-readable storage medium, coupled to the one or more processors, storing program instructions that, when executed by the one or more processors, cause the one or more processors to perform operations comprising:
receiving a key-value pair to be stored in a dispersed storage network (dsNet);
routing a key and a value of the key-value pair within a data source, the data source containing a SourceName repository and a data buffer, the key being routed to the SourceName repository and the value being routed to the data buffer;
erasure encoding the data source into a set of data slices, each data slice having a slice name and a slice buffer;
storing the set of data slices within the dsNet; and
generating a namespace index with an index entry for the key-value pair, the index entry represents the key-value pair as a SourceName and a data source indicator, the SourceName and the data source indicator being associated with the set of data slices.

9. The system of claim 8, wherein the key is encoded in the SourceName and the value is encoded in the data source indicator within the index entry for the key-value pair within the namespace index.

10. The system of claim 8, wherein the data source is erasure encoded using an information dispersal algorithm.

11. The system of claim 8, wherein the operations further comprise:
maintaining uniform distribution of SourceNames within the dsNet.

12. The system of claim 11, wherein the operations further comprise:
generating a key chunk map for the namespace index.

13. The system of claim 12, wherein the key chunk map includes a first mapping for each key by data slice index and a second mapping for each key by namespace index key-space.

14. The system of claim 12, wherein the operations further comprise:
distributing data slices within the dsNet based on the key chunk map and the namespace index.

15. A computer program product comprising a computer readable storage medium having program instructions embodied therewith, the program instructions being executable by one or more processors to cause the one or more processors to perform operations comprising:
receiving a key-value pair to be stored in a dispersed storage network (dsNet);
routing the key and the value within a data source, the data source containing a SourceName repository and a data buffer, the key being routed to the SourceName repository and the value being routed to the data buffer;
erasure encoding the data source into a set of data slices, each data slice having a slice name and a slice buffer;
storing the set of data slices within the dsNet; and
generating a namespace index with an index entry for the key-value pair, the index entry represents the key-value pair as a SourceName and a data source indicator, the SourceName and the data source indicator being associated with the set of data slices.

16. The computer program product of claim 15, wherein the key is encoded in the SourceName and the value is encoded in the data source indicator within the index entry for the key-value pair within the namespace index.

17. The computer program product of claim 15, wherein the data source is erasure encoded using an information dispersal algorithm.

18. The computer program product of claim 15, wherein the operations further comprise:
   maintaining uniform distribution of SourceNames within the dsNet.

19. The computer program product of claim 18, wherein the operations further comprise:
   generating a key chunk map for the namespace index, the key chunk map including a first mapping for each key by data slice index and a second mapping for each key by namespace index keyspace.

20. The computer program product of claim 19, wherein the operations further comprise:
   distributing data slices within the dsNet based on the key chunk map and the namespace index.

* * * * *